(12) United States Patent
Lee et al.

(10) Patent No.: US 8,875,262 B2
(45) Date of Patent: Oct. 28, 2014

(54) METHOD AND APPARATUS FOR SECURE COMMUNICATION BETWEEN MOBILE DEVICES

(75) Inventors: Kyung-hee Lee, Gyeonggi-do (KR); Korkishko Tymur, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 474 days.

(21) Appl. No.: 13/007,093

(22) Filed: Jan. 14, 2011

(65) Prior Publication Data

US 2011/0179473 A1 Jul. 21, 2011

(30) Foreign Application Priority Data

Jan. 15, 2010 (KR) ........................ 10-2010-0003931

(51) Int. Cl.
*G06F 21/20* (2006.01)
*G06F 21/60* (2013.01)
*H04L 9/32* (2006.01)
*H04L 29/06* (2006.01)

(52) U.S. Cl.
CPC ......... *H04L 63/1466* (2013.01); *H04L 63/1441* (2013.01); *G06F 21/606* (2013.01); *H04L 2209/80* (2013.01); *H04L 9/3236* (2013.01); *H04L 9/3263* (2013.01); *G06F 2221/2113* (2013.01); *H04L 63/105* (2013.01); *H04L 63/08* (2013.01); *G06F 2221/2117* (2013.01)
USPC .......................................................... 726/6

(58) Field of Classification Search
CPC ....... G06F 21/31; H04L 6/083; H04L 63/102; H04L 63/0815; H04L 63/08
See application file for complete search history.

(56) References Cited

U.S. PATENT DOCUMENTS

| | | | | |
|---|---|---|---|---|
| 5,513,263 | A  * | 4/1996  | White et al. | 380/44 |
| 6,850,911 | B1 * | 2/2005  | Huether | 705/51 |
| 7,114,075 | B1 * | 9/2006  | Yasuda et al. | 713/182 |
| 7,797,406 | B2 * | 9/2010  | Patel et al. | 709/220 |
| 8,646,028 | B2 * | 2/2014  | McKenzie et al. | 726/1 |
| 2002/0169874 | A1* | 11/2002 | Batson et al. | 709/225 |
| 2003/0154263 | A1* | 8/2003  | Hirai | 709/219 |
| 2007/0186103 | A1* | 8/2007  | Randle et al. | 713/168 |
| 2007/0198849 | A1* | 8/2007  | Mozer | 713/186 |
| 2007/0250712 | A1* | 10/2007 | Salgado et al. | 713/171 |
| 2007/0298782 | A1* | 12/2007 | Wu | 455/424 |
| 2008/0144824 | A1  | 6/2008  | Stewart et al. | |
| 2009/0080650 | A1* | 3/2009  | Selgas et al. | 380/44 |
| 2009/0276622 | A1* | 11/2009 | Matsuo | 713/155 |
| 2009/0292930 | A1* | 11/2009 | Marano et al. | 713/189 |
| 2010/0122331 | A1* | 5/2010  | Wang et al. | 726/6 |
| 2010/0180009 | A1* | 7/2010  | Callahan | 709/217 |
| 2010/0321197 | A1* | 12/2010 | Wong et al. | 340/691.3 |
| 2011/0002341 | A1* | 1/2011  | Damola et al. | 370/401 |
| 2011/0093938 | A1* | 4/2011  | Asokan et al. | 726/7 |
| 2011/0150220 | A1* | 6/2011  | Breton et al. | 380/255 |
| 2011/0154021 | A1* | 6/2011  | McCann et al. | 713/153 |
| 2011/0179473 | A1* | 7/2011  | Lee et al. | 726/6 |

* cited by examiner

*Primary Examiner* — Farid Homayounmehr
*Assistant Examiner* — Sanchit Sarker
(74) *Attorney, Agent, or Firm* — The Farrell Law Firm, P.C.

(57) ABSTRACT

Methods and apparatuses for secure communication are provided. The secure communication method includes receiving a first credential of a remote device; receiving first authentication information of the remote device; storing a user record including the first credential and the first authentication information; and evaluating a security level of the received first authentication information.

25 Claims, 7 Drawing Sheets

FIG. 2

| Factor | Factor range/Value | Score | Code |
|---|---|---|---|
| NUMBER OF BITS OF AUTHENTICATION INFORMATION (210) | 0 – 40 bits | 3 | A |
| | 41 – 100 bits | 5 | |
| | 101 – 160 bits | 10 | |
| COMMUNICATION CHANNEL TYPE (220) | VoIP SECURE COMMUNICATION CHANNEL | 10 | B |
| | SMS/MMS | 3 | |
| | DATA COMMUNICATION | 3 | |
| COMMUNICATION CHANNEL QUALITY (230) | QUALITY OF VoIP SECURE COMMUNICATION CHANNEL<br>3.9 – 4.9<br>3 – 3.9<br>0 – 2.9 | 10<br>5<br>1 | C |
| | SMS/MMS | 3 | |
| | DATA COMMUNICATION | 3 | |

FIG. 3

| Final score range | Trust level |
|---|---|
| 25 – 30 | Trusted |
| 15 – 24 | Partially trusted |
| < 14 | Untrusted |

METHOD AND APPARATUS FOR SECURE COMMUNICATION BETWEEN MOBILE DEVICES

PRIORITY

This application claims priority under 35 U.S.C. §119(a) to a Korean Patent Application filed in the Korean Intellectual Property Office on filed on Jan. 15, 2010 and assigned Serial No. 10-2010-0003931, the entire contents of which are incorporated herein by reference.

BACKGROUND OF THE INVENTION

1. Field of the Invention

The present invention relates generally to methods and apparatuses for secure communication between mobile devices, and more particularly, to methods and apparatuses for secure communication between mobile devices, in which authentication information is exchanged between mobile devices, and a secure channel is established according to a user's choice and an evaluated security level.

2. Description of the Related Art

A mobile device may securely transmit data to another mobile device using previously distributed authentication information. Such previously distributed authentication information may include a public key of a peer device to communicate with the mobile device. This authentication information may be easily distributed if the devices are geographically adjacent to each other.

For example, a mobile device may exchange authentication information with another mobile device via a near field communication medium and check whether the authentication information has been exchanged accurately. Alternatively, for example, a mobile device may exchange authentication information with another mobile device using a storage medium (e.g., memory card) in which the authentication information is stored.

In the two above-described examples, a user of the mobile device may be guaranteed integrity of the exchanged authentication information, to some extent, due to the geographical adjacency, and therefore, the mobile device may establish a secure communication channel with another mobile device using the exchanged authentication information.

However, if authentication information is distributed remotely, an attack on the security of the communication channel may occur.

More specifically, an attacker may intercept between devices that are communicating with each other and change authentication information being exchanged between the devices to authentication information of the attacker, in order for the attacker to eavesdrop on or change contents of the communication. This type of attack is known as a "man in the middle" attack.

Therefore, there is a need for a method of establishing a secure communication channel in which authentication information is securely distributed between remote mobile devices.

SUMMARY OF THE INVENTION

Accordingly, an aspect of the present invention provides methods and apparatuses for enabling secure communication between mobile devices, in which authentication information is exchanged between mobile devices and a secure channel is established by choice of a user, based on an evaluated security level, and further provides computer-readable recording mediums having embodied thereon a program for executing these methods.

According to an aspect of the present invention, a secure communication method in a communication device is provided. The method includes receiving a first credential of a remote device; receiving first authentication information of the remote device; storing a user record including the first credential and the first authentication information; and evaluating a security level of the received first authentication information.

According to another aspect of the present invention, a non-transitory computer-readable recording medium having embodied thereon a program for executing a secure communication method is provided. The method includes receiving a first credential of a remote device; receiving first authentication information of the remote device; storing a user record including the first credential and the first authentication information; and evaluating a security level of the received first authentication information.

According to another aspect of the present invention, a secure communication device is provided The secure communication device includes a credential receiving unit for receiving a first credential of a remote device; an authentication information receiving unit for receiving first authentication information of the remote device; a storing unit storing a user record including the first credential and the first authentication information; and an evaluation unit for evaluating a security level of the received first authentication information.

BRIEF DESCRIPTION OF THE DRAWINGS

The above and other features and advantages of the present invention will become more apparent by describing in detail exemplary embodiments thereof with reference to the attached drawings in which:

FIG. 2 is a table illustrating security level evaluation factors according to an embodiment of the present invention;

FIG. 3 is a table illustrating a security level according to an embodiment of the present invention;

DETAILED DESCRIPTION OF EMBODIMENTS OF THE PRESENT INVENTION

Figure 1:
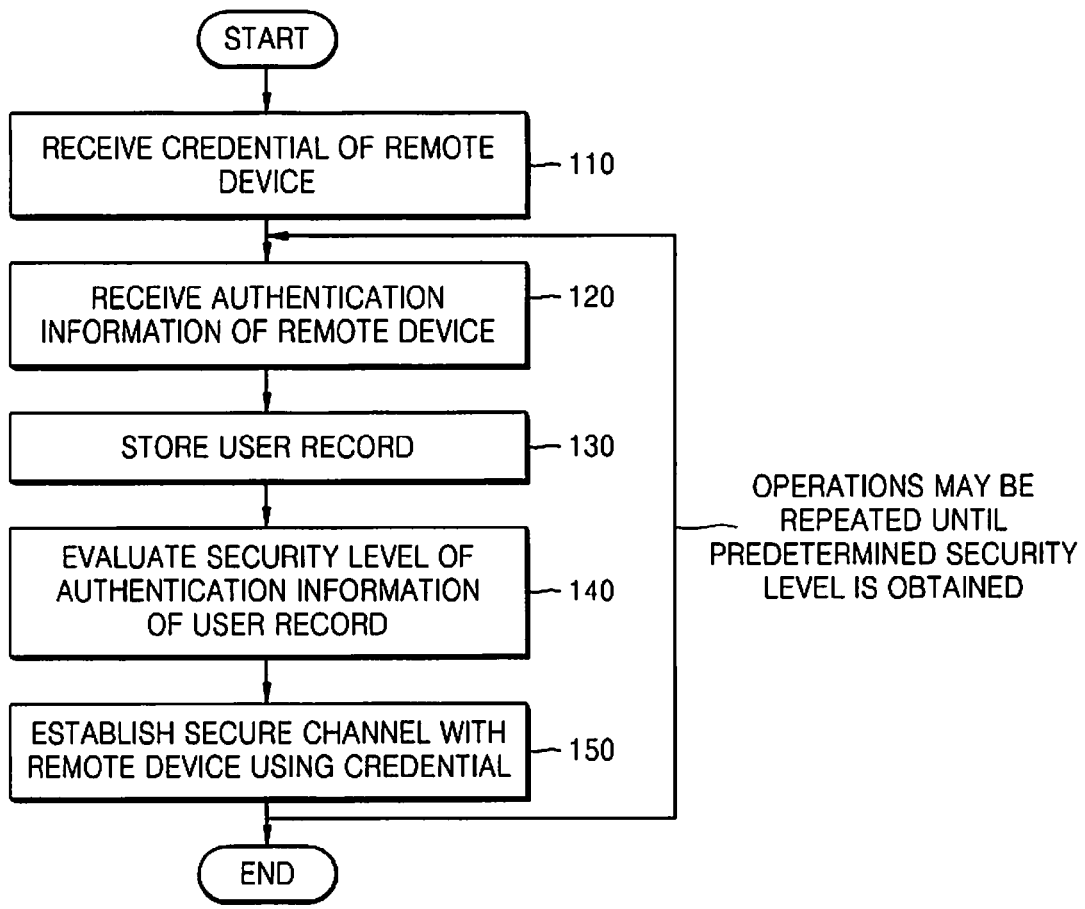
FIG. 1 is a schematic flowchart illustrating a secure communication process according to an embodiment of the present invention.

The present invention will now be described more fully with reference to the accompanying drawings. In the drawings, like reference numerals in the drawings denote like elements, and the thicknesses of elements are exaggerated for clarity. The description includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

FIG. 1 is a schematic flowchart illustrating a secure communication process according to an embodiment of the present invention.

Referring to FIG. 1, in step 110, a secure communication device receives a credential from a remote device. A credential may be generated in a remote device or provided by a certificate authority. The credential includes at least one of a public key generated in the remote device, a certificate signed by the remote device, and a certificate signed by the certificate authority.

In order to use a certificate signed by the certificate authority as a credential, a certificate through which public keys of both a remote device and a secure communication device can verify must be provided by the certificate authority.

In step 120, the secure communication device receives authentication information from the remote device. The authentication information includes a certificate including a public key of a remote device and at least one of a plurality of hash values obtained by converting the certificate using a predetermined hash function. The certificate includes at least one of the certificate signed by the remote device and the certificate signed by the certificate authority.

Steps 110 and 120 may be performed via a Voice over Internet Protocol (VoIP) secure communication channel, a voice communication control channel, data communication, a Short Message Service (SMS), and/or a Multimedia Messaging Service (MMS).

When a VoIP secure communication channel is used, an attacker cannot easily modify a credential and authentication information without decreasing the quality of voice and video signals. Also, the amount of authentication information may be selectively increased and repeatedly received to thereby increase reliability. An example of a VoIP secure communication channel is described in US Patent Application Publication No. 2008/0144824, thus detailed description thereof is omitted herein.

In step 130, the secure communication device combines the credential and the authentication information with a respective user record, and stores the user record. The secure communication device stores the user record in a telephone directory or a separate internal database. The user record may include a user name, a device number, a credential, and/or authentication information, etc.

In step 140, the secure communication device evaluates a security level of the received authentication information. The secure communication device evaluates the security level of the received authentication information based on security level evaluation factors such as illustrated in FIG. 2, for example. Security level evaluation factors and security levels according to a result of evaluation are described with reference to FIGS. 2 and 3, respectively.

In step 150, the secure communication device establishes a secure channel to the remote device using the credential. In order to establish the secure channel, the secure communication device generates a security key shared with the remote device, based on the credential. Using the security key, the secure communication device encrypts data that is to be transmitted to the secure channel, and transmits the encrypted data to the remote device. The secure channel may be a voice channel, a data communication channel, an SMS, an MMS, or any other such communication channel.

Figure 6:
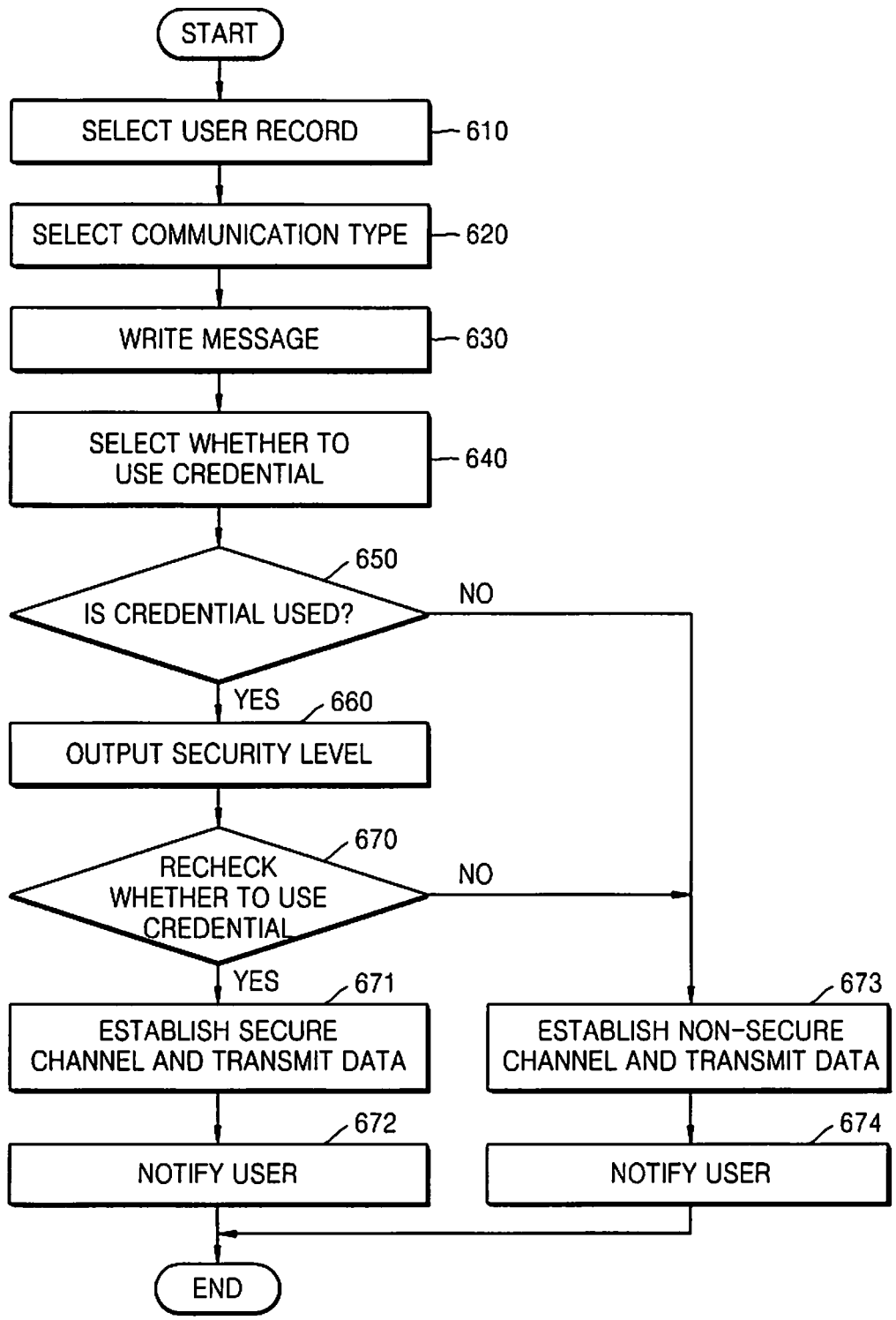
FIG. 6 is a flowchart illustrating a process of establishing a secure channel, according to an embodiment of the present invention.
Figure 7:
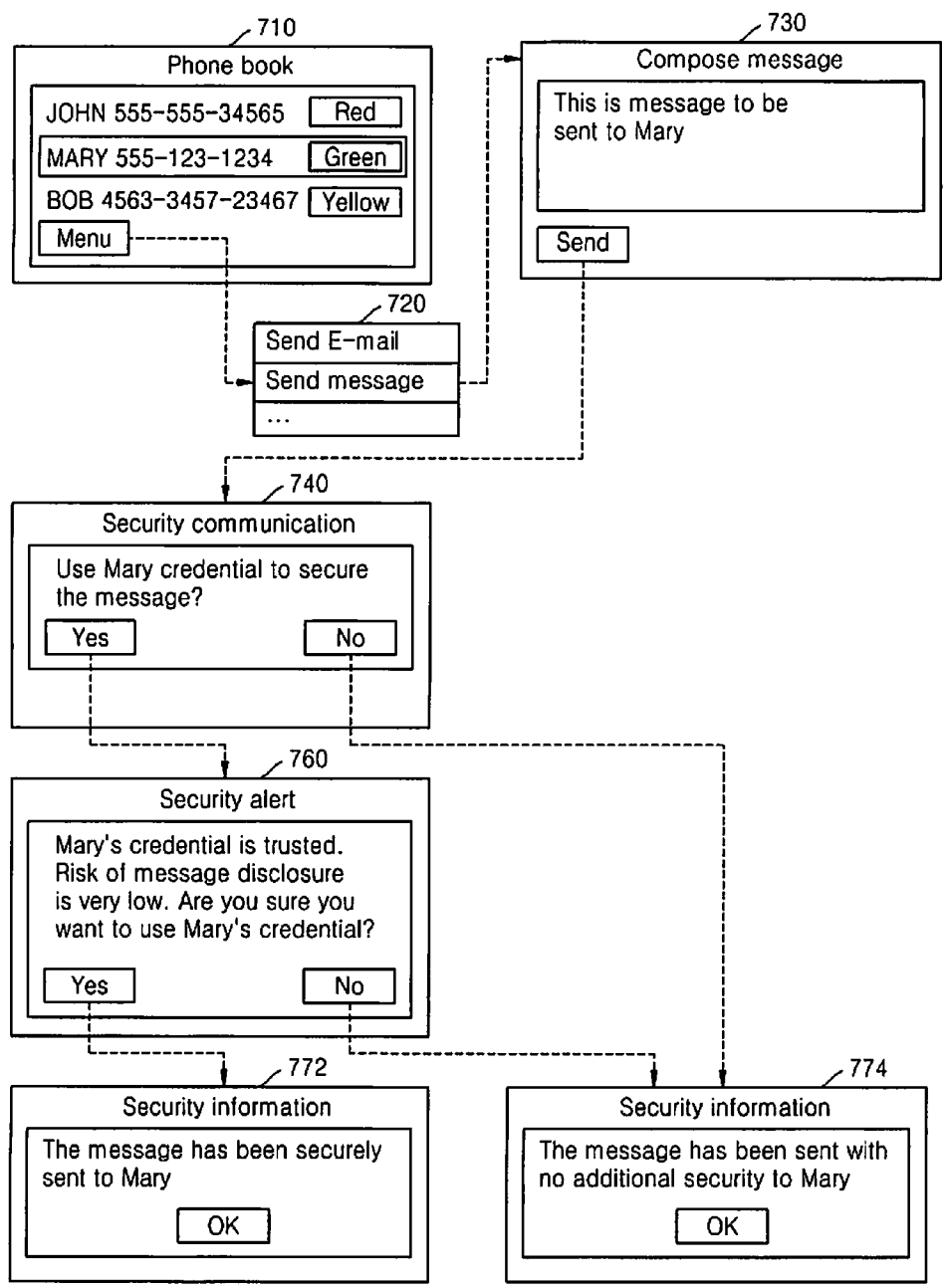
FIG. 7 is a diagram illustrating UI images according to a process of establishing a secure channel according to an embodiment of the present invention.

User Interface (UI) images corresponding to a process of establishing a secure channel are described herein with reference to FIGS. 6 and 7.

Steps 120 through 150 may be repeated until a predetermined security level is obtained.

According to the embodiment of the invention described above with reference to FIG. 1, a security level is evaluated with respect to authentication information exchanged between mobile devices and provided to the user, thereby improving the reliability of a secure channel that is established later using a credential corresponding to the authentication information.

FIG. 2 illustrates security level evaluation factors according to an embodiment of the present invention.

Referring to FIG. 2, the secure communication device may evaluate a security level of authentication information using the number of bits 210 of authentication information, a communication channel type 220 for exchanging authentication information, and a communication channel quality 230 for exchanging authentication information.

The greater the number of bits 210 of authentication information, the greater the evaluation points of the security level.

Regarding the communication channel type 220, relatively safer channel types have greater security level evaluation points than channel types that are less secure. For example, a VoIP secure communication channel usually has a greater security level evaluation point than a SMS, a MMS, and data communication.

Regarding the communication channel quality 230, a communication channel that has greater quality among VoIP secure communication channels correspondingly also has a greater security level evaluation point. The quality of a VoIP secure communication channel is measured using a perceptual evaluation of speech quality method according to ITU-T P.862. Accordingly, a detailed description thereof is omitted herein.

Although the number of bits 210 of authentication information, the communication channel type 220 for exchanging authentication information, and the communication channel quality 230 for exchanging authentication information are illustrated as evaluation factors according the embodiment of the present invention described with reference to FIG. 2, other evaluation factors may also be applied in accordance with other embodiments of the present invention.

FIG. 3 is a table illustrating a security level according to an embodiment of the present invention.

Referring to FIG. 3, the secure communication device may evaluate a security level based on the security level evaluation factors illustrated in FIG. 2. For example, a security level may be evaluated by allocating respective points to the security level evaluation factors and adding the respective points of the factors. More specifically, as shown in FIG. 3, a security level may be labeled as one of a "Trusted" level, a "Partially Trusted" level, and an "Untrusted" level, based on the added evaluation points. While the points of the security level evaluation factors are added to evaluate the security level, other evaluation methods may also be used in accordance with other embodiments of the present invention.

The evaluated security level may be added to a user record and stored in the secure communication device, and be output via a UI image. When the evaluated security level is a "Trusted" level, a "Partially Trusted" level, or an "Untrusted" level, each security level may be represented in a corresponding color (such red, yellow, and green, respectively, for example) and output via a UI image.

Figure 4:
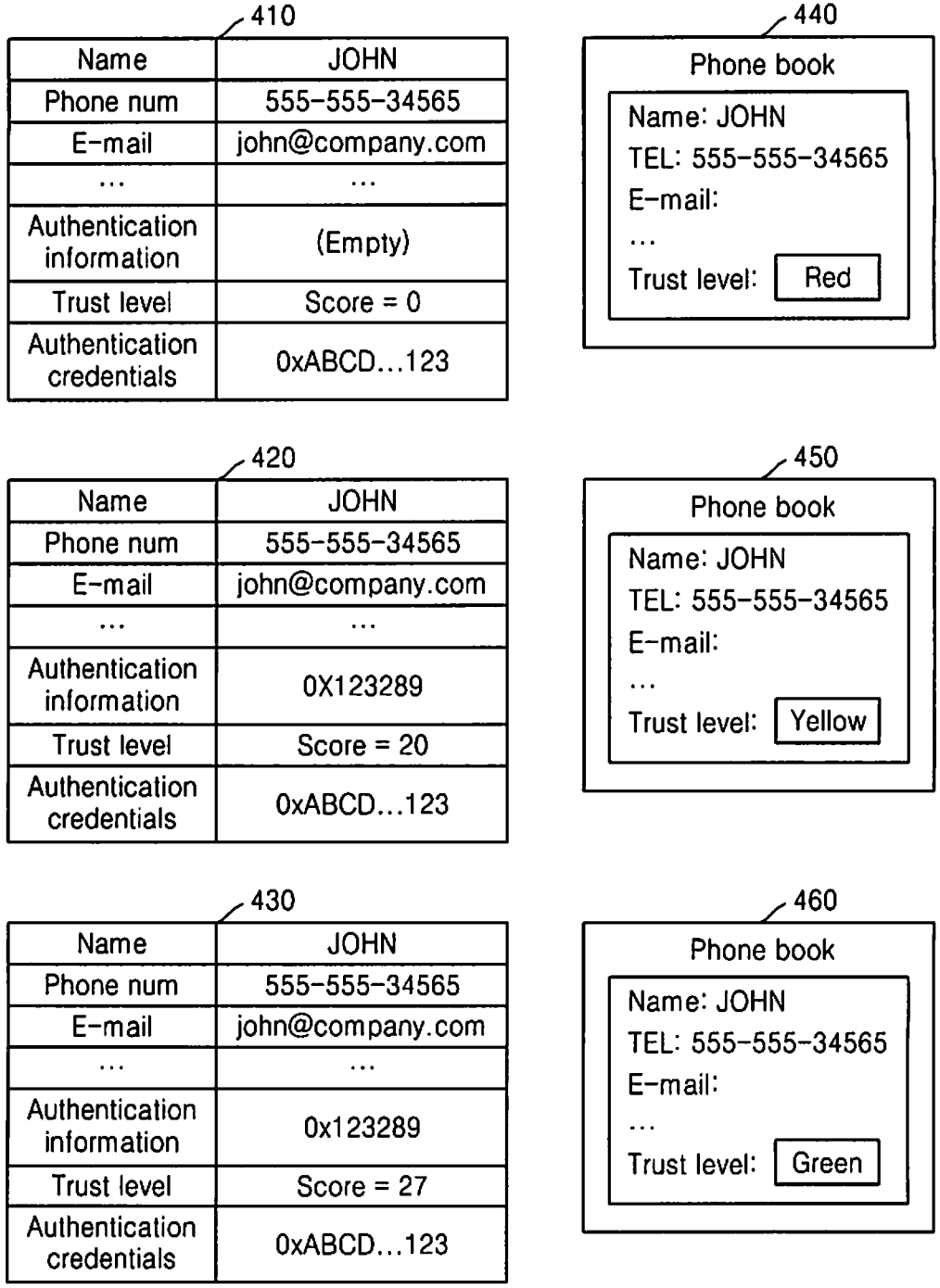
FIG. 4 is diagram illustrating modification of a user record and User Interface (UI) images according to a secure communication process, according to an embodiment of the present invention.

FIG. 4 is a diagram illustrating modification of a user record and UI images according to a secure communication process, according to an embodiment of the present invention.

Referring to FIG. 4, when a secure communication device first receives a credential of a remote device, the secure communication device combines the credential with a user record 410, and stores the user record 410.

The secure communication device evaluates a security level of the user record 410. In this case, authentication information has not been received yet, and therefore, an authentication information field of the user record 410 is empty and a value of a security level field is 0, which corresponds to an "Untrusted" level.

The user is notified of an "Untrusted" security level via a UI 440, and the secure communication device may establish a secure channel to a remote device using a credential according to a user selection.

When the secure communication device has received authentication information of the remote device, previously stored authentication information and credentials are compared in order to determine whether to renew authentication information and a corresponding credential. The renewal of the authentication information and the credential is described in detail herein with reference to FIG. 5.

The secure communication device renews a user record 420 with the received authentication information and the corresponding credential by combining the received authentication information and the corresponding credential with the user record 420 and storing the resulting combined user record 420.

The secure communication device evaluates a security level of the user record 420. In this case, a result obtained by converting the credential using a predetermined hash function and the received authentication information are compared and the number of matching bits is reflected as an evaluation factor when evaluating the security level. Referring to FIG. 4, the security level field of the user record 420 has a score of 20, and the security level is a "Partially Trusted" level.

The user is notified of the "Partially Trusted" security level via a UI 450, and the secure communication device may establish a secure channel to a remote device using a credential according to a user selection.

When the secure communication device has received authentication information of the remote device again in a subsequent communication with the remote device, previously stored authentication information and a corresponding credential are compared to determine whether to renew the authentication information and corresponding credentials.

The secure communication device renews a user record 430 with the received authentication information and the corresponding credentials by combining the received authentication information and the corresponding credential with the user record 430, and storing the resulting combined user record 430.

The secure communication device evaluates the security level of the user record 430. Referring to FIG. 4, the number of matching bits, which is found by comparing a result obtained by converting the credential using a predetermined hash function and the received authentication information, is greater than the previously received authentication information 420. Thus, the point of the security level field of the user record 430 is 27, and the security level is a "Trusted" level.

The user is notified of the "Trusted" security level via a UI 460, and the secure communication device may establish a secure channel to a remote device using a credential according to a user selection.

The secure communication device may repeat reception of authentication information, storing of the user record, and evaluation of the security level until a predetermined security level is obtained.

Figure 5:
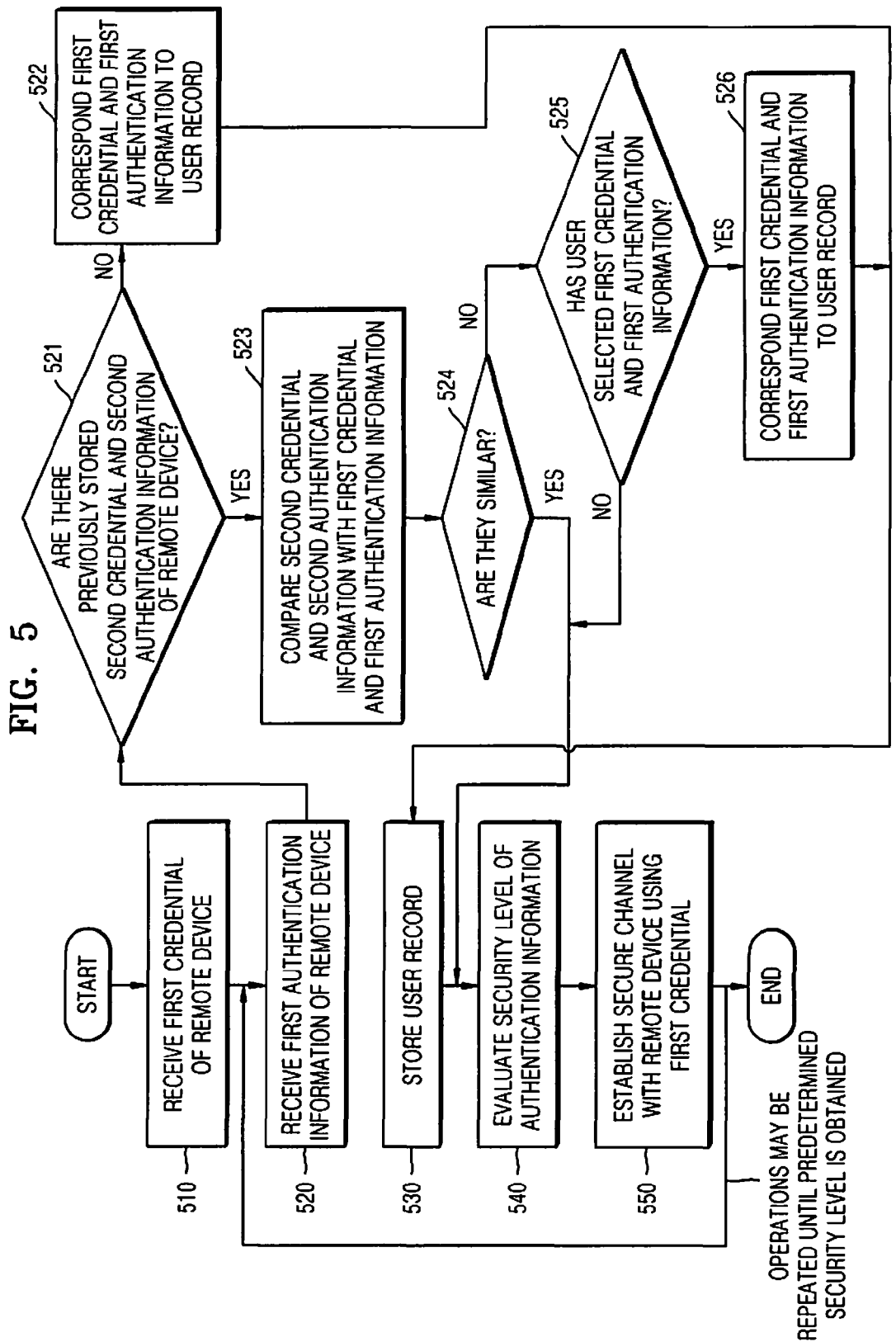
FIG. 5 is a detailed flowchart illustrating a secure communication process, according to an embodiment of the present invention.

FIG. 5 is a detailed flowchart illustrating a secure communication process, according to an embodiment of the present invention.

Referring to FIG. 5, in step 510, a secure communication device receives a credential from a remote device. In step 520, the secure communication device receives authentication information from the remote device.

In steps 521 through 526, if authentication information and credentials have been previously stored, the received authentication information and corresponding credential are compared with the previous authentication information and credentials in order to determine whether to renew the authentication information and credentials of the remote device.

More specifically, in step 521, the secure communication device determines whether stored credentials and authentication information of the remote device have been previously stored. If there are no previously stored credentials and authentication information of the remote device, the method proceeds to step 522. Otherwise, the method proceeds to step 523.

In step 522, the secure communication device combines the received authentication information and corresponding credential with a user record, and proceeds to step 530.

In step 523, the secure communication device compares the previously stored credential and authentication information of the remote device and the received authentication information and corresponding credential. In step 524, if a result of the comparison the security comparison result does not indicate a particular difference, the method proceeds to step 540. Otherwise, the method proceeds to step 525.

In step 525, the secure communication device is appointed with one of the previously stored credential and authentication information of the remote device and the received authentication information and corresponding credential according to an external input. When the previously stored credential and authentication information is selected according to an external input, the method proceeds to step 540. Otherwise, the method proceeds to step 526.

In step 526, the secure communication device combines the received authentication information and corresponding credential with a user record, and proceeds to step 530, where the secure communication device stores the user record. In step 540, the secure communication device evaluates a security level of the received authentication information. The secure communication device evaluates the security level of the received authentication information based on security level evaluation factors. In step 550, the secure communication device establishes a secure channel to a remote device using a credential.

Steps 520 through 550 may be repeated until a predetermined security level is obtained.

FIG. 6 is a flowchart illustrating a process of establishing a secure channel, according to an embodiment of the present invention. FIG. 7 illustrates UI images according to a process of establishing a secure channel according to an embodiment of the present invention.

Referring to FIG. 6, in step 610, the secure communication device receives, via an external input, a user record corresponding to a remote device to which a secure channel is to be established. Referring to FIG. 7, at 710, the secure communication device outputs user records corresponding to John, Mary, and Bob, and receives a user record corresponding to Mary according to an external input. The user record includes a security level, and the user may recognize through a green label that the security level of Mary is a "Trusted" level and select this user record.

In step 620 of FIG. 6 and item 720 of FIG. 7, the secure communication device receives a communication type via an external input.

In step 630 of FIG. 6 and item 730 of FIG. 7, the secure communication device receives a message and a transmission instruction corresponding to the communication type via an external input.

In step 640 of FIG. 6 and item 740 of FIG. 7, the secure communication device receives information regarding whether to use a credential via an external input.

In step 650, the secure communication device determines whether to use a credential. When a credential is used, the method proceeds to step 660. Otherwise, the method proceeds to step 673.

In step 660, the secure communication device outputs the security level of the selected user record.

In step 670 of FIG. 6 and item 760 of FIG. 7, the secure communication device rechecks whether to use a credential. When a credential is used, the method proceeds to step 671. Otherwise, the method proceeds to step 673.

In step 671, the secure communication device establishes a secure channel using a credential, and transmits data to the secure channel.

In step 672 of FIG. 6 and at item 772 of FIG. 7, the secure communication device notifies the user that transmission of data to the secure channel has been completed. In step 673, the secure communication device establishes a non-secure channel and transmits data to the non-secure channel. In step 674 of FIG. 6 and step 774 of FIG. 7, the secure communication device notifies the user that transmission of data to the non-secure channel has been completed.

Figure 8:
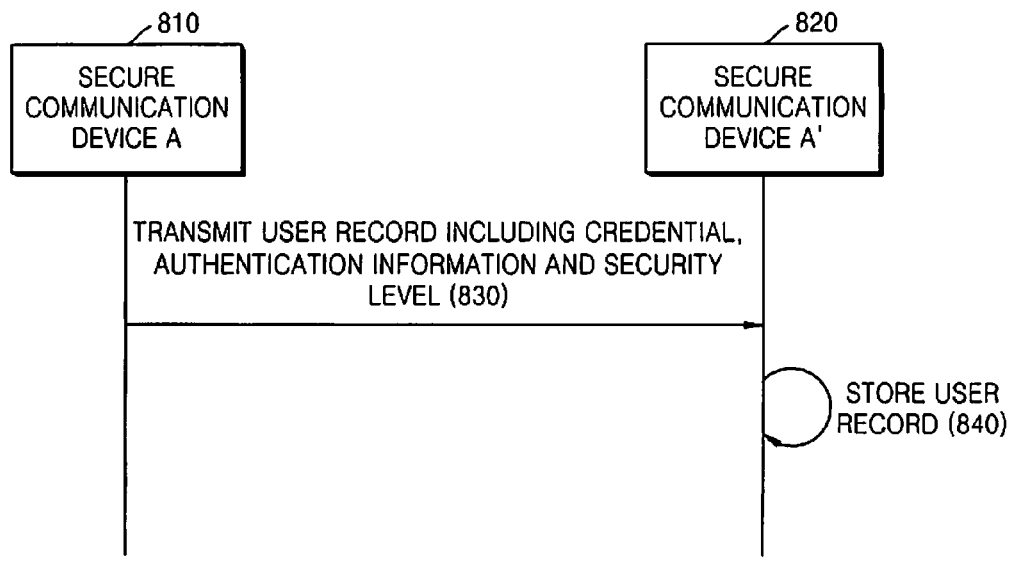
FIG. 8 is a diagram illustrating an operation of transmitting a user record to another secure communication device according to an embodiment of the present invention.

FIG. 8 is a diagram illustrating an operation of transmitting a user record to another secure communication device according to an embodiment of the present invention.

Referring to FIG. 8, when the user wants to change from a secure communication device A 810 to another secure communication device A' 820, the secure communication device A 810 transmits user records to the secure communication device A' 820 according to an external device. The user records denote user records stored in the secure communication device A 810, and each of the user records includes a credential, authentication information, and a security level.

The secure communication device A' 820 may store the received user records in a telephone directory or a separate internal database, for example.

Figure 9:
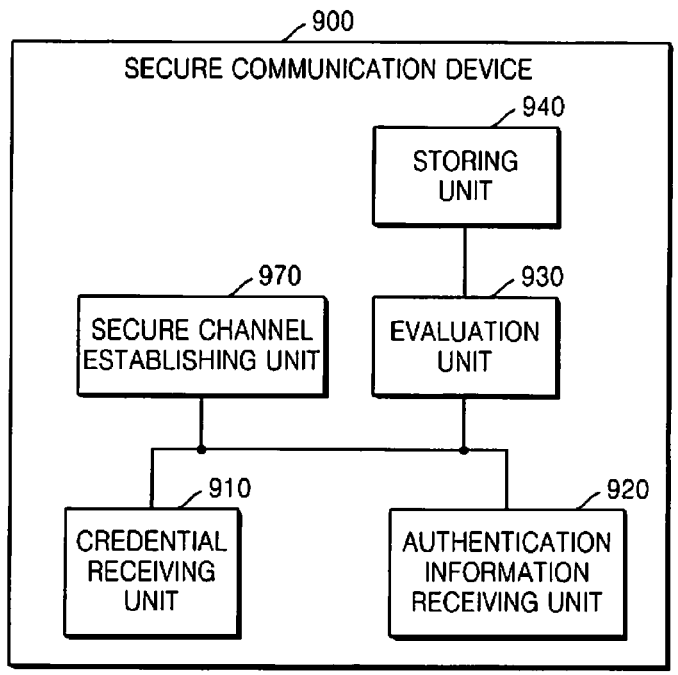
FIG. 9 is a block diagram illustrating a structure of a secure communication device according to an embodiment of the present invention.

FIG. 9 is a block diagram illustrating a structure of a secure communication device according to an embodiment of the present invention.

Referring to FIG. 9, a secure communication device 900 includes a credential receiving unit 910, an authentication information receiving unit 920, a storing unit 940, an evaluation unit 930, and a secure channel establishing unit 970.

The credential receiving unit 910 receives a credential of a remote device. The credential includes at least one public key generated in the remote device, a certificate signed by the remote device, and a certificate signed by the certificate authority.

The authentication information receiving unit 920 receives authentication information of the remote device. The authentication information includes a certificate and at least one of a plurality of hash values obtained by converting the certificate using a predetermined hash function. The certificate includes at least one of a certificate signed by the remote device and a certificate signed by the certificate authority.

The credential receiving unit 910 and the authentication information receiving unit 920 use a communication channel selected from the group consisting of a VoIP secure communication channel, a voice communication control channel, data communication, a SMS, and a MMS.

The storing unit 940 combines the credential and the authentication information with a user record, and stores the user record. The storing unit 940 stores the user record using a telephone directory or a separate internal database.

The evaluation unit 930 evaluates a security level of the authentication information. The evaluation unit 930 evaluates the security level by using a number of bits of the authentication information, a communication channel type for exchanging authentication information, and a communication channel quality for exchanging authentication information as evaluation factors. The evaluation factors include the number of matching bits found by comparing the received authentication information to a result obtained by converting the credential using a predetermined hash function.

The authentication information receiving unit 920, the storing unit 940, and the evaluation unit 930 may repeat their respective functions until a predetermined security level is obtained.

The secure channel establishing unit 970 establishes a secure channel to a remote device using a credential. According to an external input, the secure channel establishing unit 970 is appointed with a user record corresponding to the remote device to which a secure channel is to be established and determines whether to establish a secure channel. The secure channel establishing unit 970 includes a security key generating unit (not shown) for generating a security key that encrypts data to be transmitted to the remote device via the secure channel and is shared on the secure channel.

The secure communication device 900 further includes a comparing unit (not shown), a renewing unit (not shown), and an output unit (not shown).

When a credential of the remote device and authentication information of the remote device have been previously stored, the comparing unit (not shown) compares the previously stored credential and authentication information with the received credential and corresponding authentication information.

The renewing unit (not shown) selectively renews the previously stored credential and authentication information to the received credential and corresponding authentication information based on a comparison result. More specifically, when there is a difference between the previously stored credential and authentication information and the received credential and corresponding authentication information as a result of the comparison by the comparing unit, the renewing unit is appointed with the previously stored credential and authentication information or with the received authentication information and corresponding credential according to an external input. When the received authentication information and corresponding credential are selected according to the external input, the renewing unit renews the previously stored authentication information and credential to the received authentication information and corresponding credential. The output unit outputs a user record via a UI image.

While the present invention has been particularly shown and described with reference to embodiments thereof, it will be understood by those of ordinary skill in the art that various changes in form and details may be made therein without departing from the spirit and scope of the present invention as defined by the following claims.

For example, the secure communication device 900 may include a bus coupled to each unit of the devices, as illustrated in FIG. 9, and at least one processor coupled to the bus, and a memory that is coupled to the bus to store an instruction, a received message or a generated message and coupled to the at least one processor for executing instructions.

The invention can also be embodied as computer readable codes on a computer-readable recording medium. The computer-readable recording medium is any data storage device that can store data, which can be thereafter read by a computer system. Examples of the computer-readable recording medium include Read-Only Memory (ROM), Random-Access Memory (RAM), Compact Disc (CD)-ROMs, magnetic tapes, floppy disks, optical data storage devices, etc. The computer-readable recording medium can also be distributed over network-coupled computer systems so that the computer readable code is stored and executed in a distributed fashion.

What is claimed is:

1. A secure communication method in a communication device comprising:
  receiving, by the communication device, a first credential of a remote device;
  receiving, by the communication device, first authentication information of the remote device;
  storing, by the communication device, a user record including the first credential and the first authentication information; and
  evaluating, by the communication device, a security level of the received first authentication information using a communication channel quality for receiving the first authentication information as an evaluating factor,
  wherein the communication channel quality indicates a channel quality for signal transmission and reception without decreasing signal quality to a predetermined level.

2. The secure communication method of claim 1, further comprising:
  when a previously stored second credential and second authentication information of the remote device are stored in the communication device, comparing the second credential and the second authentication information with the first credential and the first authentication information; and
  selectively renewing the second credential and the second authentication information to the first credential and the first authentication information based on a result of the comparison.

3. The secure communication method of claim 2, wherein renewing the second credential comprises:
  when there is a predetermined difference between the previously stored second credential and second authentication information and the first credential and the first authentication information as a result of the comparison, appointing one pair selected from a pair of the second credential and the second authentication information or the first credential and a pair of the first authentication information according to an external input; and
  when the first credential and the first authentication information are selected according to an external input, renewing the previously stored second credential and second authentication information of the remote device to the first credential and the first authentication information.

4. The secure communication method of claim 1, wherein the first credential includes at least one of a public key generated in the remote device, a first certificate signed by the remote device, and a second certificate signed by a certificate authority; and
  the first authentication information includes at least one selected from the group consisting of the first certificate, the second certificate, a first hash value obtained by converting the first certificate using a predetermined hash function, and a second hash value obtained by converting the second certificate using the predetermined hash function.

5. The secure communication method of claim 1, wherein the receiving a first credential of the remote device and the receiving of first authentication information of the remote device are performed via at least one selected from the group consisting of a Voice over Internet Protocol (VoIP) secure communication channel, a voice communication control channel, data communication, a Short Message Service (SMS), and a Multimedia Messaging Service (MMS).

6. The secure communication method of claim 4, further comprising:
  repeating the receiving of first authentication information of the remote device, the storing of the user record, and the evaluating of the security level.

7. The secure communication method of claim 1, wherein the evaluating factor includes a communication channel type for receiving the first authentication and a number of bits found by comparing a result obtained by converting the credential using the predetermined hash function and the received first authentication information.

8. The secure communication method of claim 1, further comprising outputting the user record via a User Interface (UI) image.

9. The secure communication method of claim 1, wherein the user record includes a user name, a device number, a credential, authentication information, and a security level, and
  wherein storing the user record includes storing the user record in a telephone directory or a separate internal database.

10. The secure communication method of claim 1, further comprising establishing a secure channel to the remote device using the first credential.

11. The secure communication method of claim 10, further comprising selecting the user record and determining whether to establish the secure channel according to an external input.

12. The secure communication method of claim 10, wherein establishing the secure channel includes generating a public key that encrypts data to be transmitted to the remote device via the secure channel and is shared on the secure channel.

13. A secure communication device comprising:
  a credential receiver configured to receive a first credential of a remote device;
  an authentication information receiver configured to receive a first authentication information of the remote device;
  a storage device configured to store a user record including the first credential and the first authentication information; and
  an evaluator configured to evaluate a security level of the received first authentication information by using a communication channel quality for receiving the first authentication information as an evaluation factor, wherein the communication channel quality indicates a channel quality for signal transmission and reception without decreasing signal quality to a predetermined level.

14. The secure communication device of claim 13, further comprising:
a comparator configured to compare the second credential and the second authentication information with the first credential and the first authentication information when a previously stored second credential and second authentication information of the remote device are stored in the communication device; and
a renewer configured to renew the previously stored second credential and second authentication information of the remote device to the first credential and the first authentication information based on a result of the comparison.

15. The secure communication device of claim 14, wherein the renewer is appointed with one pair selected from a pair of the second credential and the second authentication information and a pair of the first credential and the first authentication information according to an external input when the second credential and the second authentication information shows a predetermined difference from the first credential and the first authentication information as a result of the comparison, and renews the previously stored second credential and second authentication information of the remote device to the first credential and the first authentication information when the first credential and the first authentication information are selected according to an external input.

16. The secure communication device of claim 13, wherein the first credential includes at least one selected from the group consisting of a public key generated in the remote device, a first certificate signed by the remote device, and a second certificate signed by a certificate authority; and
the first authentication information includes at least one selected from the group consisting of the first certificate, the second certificate, a first hash value obtained by converting the first certificate using a predetermined hash function, and a second hash value obtained by converting the second certificate using the predetermined hash function.

17. The secure communication device of claim 13, wherein the credential receiver and the authentication information receiving unit are configured to use at least one selected from the group consisting of a Voice over Internet Protocol (VoIP) secure communication channel, a voice communication control channel, data communication, a Short Message Service (SMS), and a Multimedia Messaging Service (MMS).

18. The secure communication device of claim 13, wherein the authentication information receiver, the storage device, and the evaluator are configured to perform their respective functions repeatedly.

19. The secure communication device of claim 13, wherein the evaluating factor includes a communication channel type for receiving the first authentication and a number of bits found by comparing a result obtained by converting the first credential using the predetermined hash function and the first authentication information.

20. The secure communication device of claim 18, further comprising a user record output device to output the user record via a User Interface (UI) image.

21. The secure communication device of claim 18, wherein the user record comprises a user name, a device number, a credential, authentication information, and a security level, and
wherein storing the user record includes storing the user record in a telephone directory or a separate internal database.

22. The secure communication device of claim 13, further comprising a secure channel establisher configured to establish a secure channel to the remote device using the first credential.

23. The secure communication device of claim 22, further comprising a secure channel establishment input device configured to select the user record and determine whether to establish a secure channel according to an external input.

24. The secure communication device of claim 22, wherein the secure channel establisher includes a security key generator configured to generate a security key that is shared on the secure channel and encrypts data to be transmitted to the remote device via the secure channel.

25. A non-transitory computer-readable recording medium having embodied thereon a program for executing a secure method, the method comprising:
receiving a first credential of a remote device;
receiving first authentication information of the remote device;
storing a user record including the first credential and the first authentication information; and
evaluating a security level of the received first authentication information using a communication channel quality for receiving the first authentication information as an evaluating factor,
wherein the communication channel quality indicates a channel quality for signal transmission and reception without decreasing signal quality to a predetermined level.

* * * * *